(12) United States Patent
Mentzel et al.

(10) Patent No.: US 9,580,108 B2
(45) Date of Patent: *Feb. 28, 2017

(54) WHEEL CARRIER OF A VEHICLE HAVING A CLAMPING SEAT CONNECTION TO A SUSPENSION STRUT

(71) Applicant: Bayerische Motoren Werke Aktiengesellschaft, Munich (DE)

(72) Inventors: Johannes Mentzel, Munich (DE); Thomas Doll, Holzkirchen (DE); Andreas Petzi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,910

(22) Filed: Apr. 27, 2015

(65) Prior Publication Data

US 2015/0307133 A1 Oct. 29, 2015

(30) Foreign Application Priority Data

Apr. 25, 2014 (DE) ........................ 10 2014 207 772

(51) Int. Cl.
*B62D 21/11* (2006.01)
*B60G 3/02* (2006.01)
(Continued)

(52) U.S. Cl.
CPC ................ *B62D 21/11* (2013.01); *B60G 3/02* (2013.01); *B60G 13/005* (2013.01); *B60G 15/07* (2013.01);
(Continued)

(58) Field of Classification Search
CPC ....... B60G 3/02; B60G 7/02; B60G 2206/016; B60G 2204/143; B62D 21/155
See application file for complete search history.

(56) References Cited

U.S. PATENT DOCUMENTS 5,482,322 A 1/1996 Wheatley et al.
8,857,555 B2 * 10/2014 Paintmayer .............. B60G 7/02
180/274
(Continued)

FOREIGN PATENT DOCUMENTS

DE         195 42 496 C1    10/1996
DE   10 2006 057 664 A1    6/2008
(Continued)

OTHER PUBLICATIONS

German Search Report dated Apr. 15, 2015 with partial English translation (12 pages).

*Primary Examiner* — Faye M Fleming
(74) *Attorney, Agent, or Firm* — Crowell & Moring LLP (57) ABSTRACT

A wheel carrier of a vehicle includes a clamping seat connection to a suspension strut or the like, which connection is clamped by a bolt-type connection. A lever structure is attached by this bolt-type connection to the clamping seat connection of the wheel carrier, from which lever structure an impact section projects from the bolt-type connection such that an obstacle striking this impact section or other object striking this impact section causes, in a vehicle crash, an at least partial release of the suspension strut in or from the clamping seat connection as a result of the impact.

8 Claims, 8 Drawing Sheets

(51) Int. Cl.
  *B62D 21/15* (2006.01)
  *B60G 13/00* (2006.01)
  *B60G 15/07* (2006.01)

(52) U.S. Cl.
  CPC ....... *B62D 21/155* (2013.01); *B60G 2204/129* (2013.01); *B60G 2204/1484* (2013.01); *B60G 2204/4304* (2013.01); *B60G 2206/016* (2013.01); *B60G 2206/50* (2013.01)

(56) References Cited

U.S. PATENT DOCUMENTS

| | | |
|---|---|---|
| 2013/0241166 A1 | 9/2013 | Paintmayer et al. |
| 2016/0009153 A1* | 1/2016 | von Hasselbach .... B60G 7/001 280/124.125 |

FOREIGN PATENT DOCUMENTS

| | | |
|---|---|---|
| DE | 10 2012 204 032 A1 | 9/2013 |
| DE | 10 2013 016 767 A1 | 8/2014 |

* cited by examiner

WHEEL CARRIER OF A VEHICLE HAVING A CLAMPING SEAT CONNECTION TO A SUSPENSION STRUT

CROSS REFERENCE TO RELATED APPLICATION

This application claims priority under 35 U.S.C. §119 from German Patent Application No. 10 2014 207 772.9, filed Apr. 25, 2014, the entire disclosure of which is herein expressly incorporated by reference.

BACKGROUND AND SUMMARY OF THE INVENTION

The invention relates to a wheel carrier of a vehicle having a clamping seat connection to a suspension strut or the like. With regard to the prior art, reference is made to DE 10 2012 204 032 A1, as well as to DE 10 2006 057 664 A1 and DE 195 42 496 C1.

A fundamental goal in designing a vehicle, for example, an automobile, is to make the vehicle as safe as possible, in particular, in the event of an accident, i.e., when the vehicle strikes an obstacle (=crash). Vehicle components (=vehicle front end) located, as viewed in the direction of travel, in front of the vehicle interior should as much as possible not intrude into the vehicle interior as a result of a crash in order to minimize the risk of injuring vehicle occupants due to the crash. In terms of the front wheels of the vehicle, a design for the wheel-guiding control arms is well-known, e.g., for the front wheels of the vehicle wherein the wheel is pivoted laterally outward in a so-called offset crash, where to this end a rear transverse control arm strut is longitudinally deformable, i.e., can be compressed, in an energy-absorbing manner.

A special case of an offset crash is a crash having only a small overlap, i.e., a crash with an obstacle that is narrow in relation to the width of the vehicle. Such a crash can be critical in particular if the obstacle intrudes into the vehicle front end without simultaneously impacting the actual crash structure of the vehicle, which is formed by an axle beam and an engine mount in the case of a conventional automobile. If this type of obstacle intrudes as the result of a crash into the space between a front axle beam and a front wheel of the vehicle (automobile), this could possibly affect the suspension of this wheel such that the wheel tends to be displaced toward the longitudinal central axis of the vehicle. This can lead to disadvantageous deformations in terms of intrusion into the vehicle interior. An appropriately positioned add-on part is proposed specifically for this situation in DE 10 2012 204 032 A1 for a front wheel suspension of a vehicle. The part is displaced in such a way by an impacting obstacle or another object due to the vehicle's hitting this obstacle that, as a result, at least one of the articulated linkages of the wheel-guiding control arm is opened or destroyed, thereby releasing the control arm relative to the axle beam or the wheel carrier. The result is that the wheel carried thereby can be diverted in the desired direction away from the vehicle interior.

The object of the invention is to provide a further advantageous measure by which a front wheel of a vehicle during a crash of the vehicle (or a rear wheel of a vehicle in a rear-end crash thereof) can be, as it were, partially released from the wheel-controlling element thereof, with the result that this wheel can move away in the desired fashion and not endanger the vehicle occupants.

This and other objects are achieved by a wheel carrier of a vehicle comprising a clamping seat connection to a suspension strut or the like, which connection is clamped by a bolt-type connection, wherein a lever structure is attached to this bolt-type connection on the clamping seat connection of the wheel carrier, from which structure an impact section projects such that an obstacle striking this impact section in a vehicle crash, or another object striking this impact section as caused by this obstacle, effects an at least partial release of the suspension strut in or from the clamping seat connection as a result of the impact.

A measure is provided by this invention by which the connection between the wheel carrier and a suspension strut or the like through which the vehicle body is supported on the wheel carrier, which for a conventional steerable front wheel is called the steering knuckle or swivel bearing, is released or at least loosened in the event of a corresponding crash of the vehicle with/against an obstacle. DE 10 2006 057 664 A1 can be cited, for example, as prior art for a (conventional) clamping seat connection between a suspension strut and a wheel carrier or swivel bearing that can be loosened in the event of a certain crash according to the invention. For example, a lever structure according to the invention can be provided under the head of the bolt depicted in this last-referenced publication, which structure functions by the approach according to the invention.

A preferred orientation of the lever structure is provided specifically partially into a free space, which is located further up and proves to be critical (between the wheel carrier and axle beam or the vehicle body) than this space located to the side of the already-present so-called crash structure of the vehicle. If, in an advantageous development, the lever structure according to the invention is appropriately supported by a so-called support section, for example, on the clamping seat connection of the wheel carrier, this lever structure can by way of this support use the force, acting through the crash against the obstacle or other referenced object in the best possible way, to loosen or at least partially loosen the bolt-type connection securing the clamping seat connection, e.g., whereby the head of the bolt of the referenced clamping seat connection is broken off due to this impact force acting on the impact section. The lever structure with this support will thus deform to a lesser degree due to the impact force from an obstacle or the like than without this support, and a physical leverage effect can be utilized in terms of the support point creating a rest pole in terms of the inventive action of the lever structure with lever arms extending from this point. The same applies for another possible design of action for the lever structure according to the invention whereby it is not the referenced bolt-type connection (of the clamping seat connection) that is loosened or released due to a force from a vehicle crash acting on the impact section of the structure; instead the lever structure produces appropriate damage to the suspension strut or the like attached to the referenced clamping seat connection and this also results in an at least partial release of the suspension strut from this clamping seat connection.

In addition, the lever structure can preferably project by the free end thereof opposite the attachment section, which is called the securing section of the lever structure, into a separation joint of the clamping seat. The result is that the structure effects a motion expanding this separation joint (and thus "leverages open" this separation joint) due to the impact of the obstacle or the referenced object against the impact section, thereby further enhancing the loosening or releasing of the referenced clamping seat connection. Even if this latter aspect cannot be realized, this embodiment can at least ensure that the lever structure is not deformed in unwanted fashion due to a force acting on the impact section thereof, but instead can properly perform the function assigned thereto.

Other objects, advantages and novel features of the present invention will become apparent from the following detailed description of one or more preferred embodiments when considered in conjunction with the accompanying drawings.

DETAILED DESCRIPTION OF THE DRAWINGS

The figures present three-dimensional views, some from different perspectives, depicting different embodiments of a lever structure according to the invention on a clamping seat connection between a wheel carrier, not shown, on the front axle of an automobile and the base of a suspension strut by which part of the vehicle body is supported on this wheel carrier or on a front wheel of the vehicle mounted thereon.

As is the conventional approach with motor vehicles, the x-axis extends along the longitudinal axis of the vehicle, while the y-axis represents the transverse axis of the vehicle and the z-axis represents the vertical axis. Accordingly, the above-mentioned x-y plane is oriented parallel to the roadway while the x-z plane extends perpendicular to the roadway in the longitudinal axis of the vehicle.

Reference numeral 1 in all of the figures identifies the wheel carrier (not expressly shown), while reference numeral 2 identifies the base of a suspension strut or the like by which part of the vehicle body is supported on this wheel carrier or on a wheel of the vehicle mounted thereon. The above-referenced clamping seat connection 3 is composed of an annular structure on wheel carrier 1, which structure is open at the top and bottom, i.e., essentially in the vertical axis in the view provided in the figures. Into the interior of the annular structure creating a circular cylinder is inserted the circular-cylindrical base 2 of the suspension strut—reference numeral 2 also being used below for this strut. In the wall of this annular structure also creating clamping seat connection 3—as is conventionally done—a slot 4 is provided (this is not visible in all of the figures and views). The slot 4 extends continuously throughout in the radial direction and over the entire height of the annular structure extending in the longitudinal direction of the suspension strut, whereby the width of the slot as measured in the circumferential direction of the annular structure can be varied by a bolt-type connection 5. In terms of this bolt-type connection 5 in most of the figures or views, only the head (also reference numeral 5) is visible for the bolt of this bolt-type connection 5, which bolt extends tangentially to the referenced annular structure that also forms clamping seat connection 3.

Bolt-type connection 5 clamps not only the referenced annular structure of clamping seat connection 3 of wheel carrier 1, but also attaches or also retains a bracket 6 for a brake-fluid line (not shown), leading to wheel carrier 1 as well as the inventive lever structure 7. Both bracket 6 and also lever structure 7 each have a through-hole, not shown, through which the shaft of bolt 5 or bolt-type connection 5 passes. The inventive lever structure 7 functions to release suspension strut 2 at least partially in or from clamping seat connection 3 in the event of a vehicle crash by which an obstacle or other object impacts this lever structure 7. The figures depict, by way of example, various embodiments of this lever structure 7.

Figure 1:
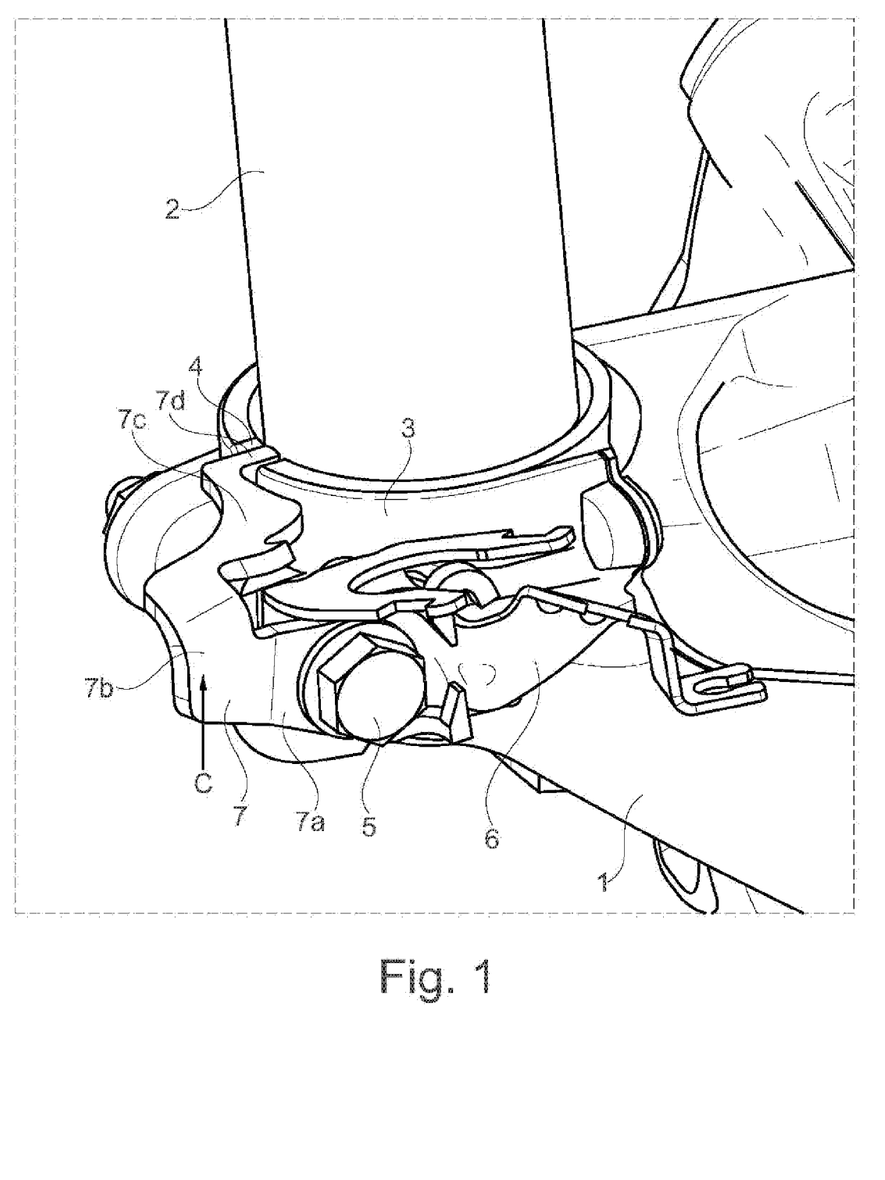
FIG. 1 depicts a first lever structure that acts preferentially in the x-y plane.

FIG. 1 depicts a first embodiment on the left front wheel of an automobile in a view oriented from the front approximately slightly above the x-axis obliquely to the rear and laterally outward (viewing direction slightly toward the left outside of the vehicle) such that the section of wheel carrier 1 directly adjacent to the wheel (not shown) is located on the right side of this figure. Suspension strut 2 or base 2, of which only the bottom section attached in clamping seat connection 3 is shown, extends essentially vertically (in the z-axis). The transverse axis of the vehicle extends in this figure approximately from left to right, i.e., the center longitudinal plane of the vehicle is located to the far left-hand side of the section shown in the figure.

Lever structure 7, which is located with a so-called attachment section 7a below the visible head 5 of bolt-type connection 5 (in FIG. 1), extends starting from this bolt-type connection 5 first a certain degree inward, i.e., toward the vehicle center longitudinal plane (to the left in the figure) such that lever structure 7 projects beyond wheel carrier 1 or clamping seat connection 3 thereof. This section 7b of lever structure 7 that projects beyond wheel carrier 1 or clamping seat connection 3 is intended for an impact with an obstacle in the event of a vehicle crash or other object displaced in this situation due to the vehicle's striking an obstacle and is identified below as impact section 7b. Lever structure 7 extends here starting from attachment section 7a thereof over this impact section 7b and continuing up to a so-called support section 7c by which lever structure 7 is again supported on wheel carrier 1 or the annular structure thereof that also forms clamping seat connection 3. The effect of this design is that whenever the referenced obstacle (or other object) strikes impact section 7b of lever structure 7 due to a vehicle crash as indicated by arrow C, this impact force (impulse) can be utilized in the best possible way to at least partially release bolt-type connection 5, i.e., in the arrangement shown here, for example or in particular, to tear off head 5 of the bolt from the shaft thereof. As a result, clamping seat connection 3 is at least loosened as intended for this situation, the corresponding displacement or partial deformation of the lever structure 7 proceeding essentially in the x-y plane.

In addition, lever structure 7 is shaped in such a way that the structure projects into slot 4 of clamping seat connection 3 by the free end of the structure (opposite attachment section 7a), which end adjoins support section 7c. This end is identified as the securing section 7d of lever structure 7. This securing section 7d can expand slot 4 due to the impact force indicated by arrow C and additionally loosen clamping seat connection 3; in particular, however, this makes it possible to preclude any unintended deformation of lever structure 7 when an object strikes impact section 7b, with the result instead that the effect of this impact is the desired loosening or release of bolt-type connection 5.

Figure 2:
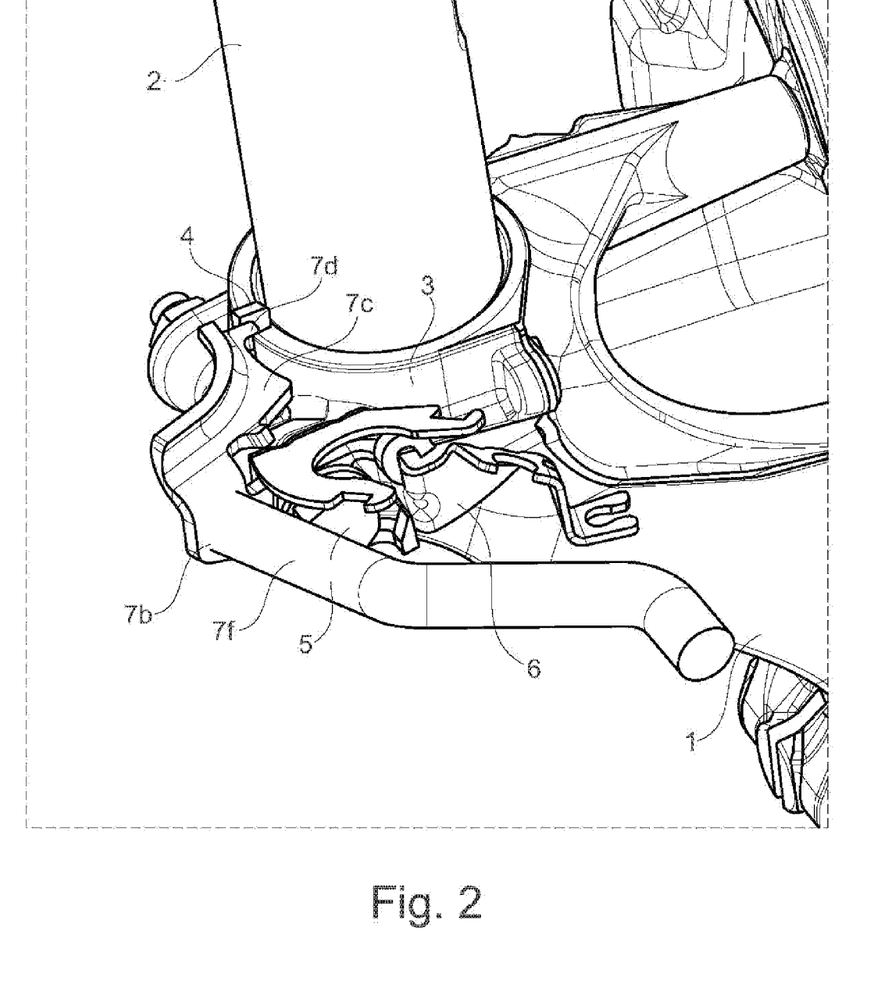
FIG. 2 depicts a modification of the embodiment of FIG. 1.

Providing the same view as FIG. 1, FIG. 2 depicts a modification of lever structure 7 in FIG. 1 whereby an extension 7f, here in the form of a tubular piece or the like, projects from impact section 7b of lever structure 7. Part of this extension or piece extends first toward the front in the travel direction and subsequently (or simultaneously) in the vehicle transverse axis to the outside. In the event of a critical vehicle crash, an obstacle or other object caused by this obstacle strikes extension 7f, by which this impact force is appropriately introduced into lever structure 7. This results in an at least partial release of bolt-type connection 5 with a displacement and partial deformation of lever structure 7 essentially in the x-y plane, as described with reference to FIG. 1.

Figure 3A:
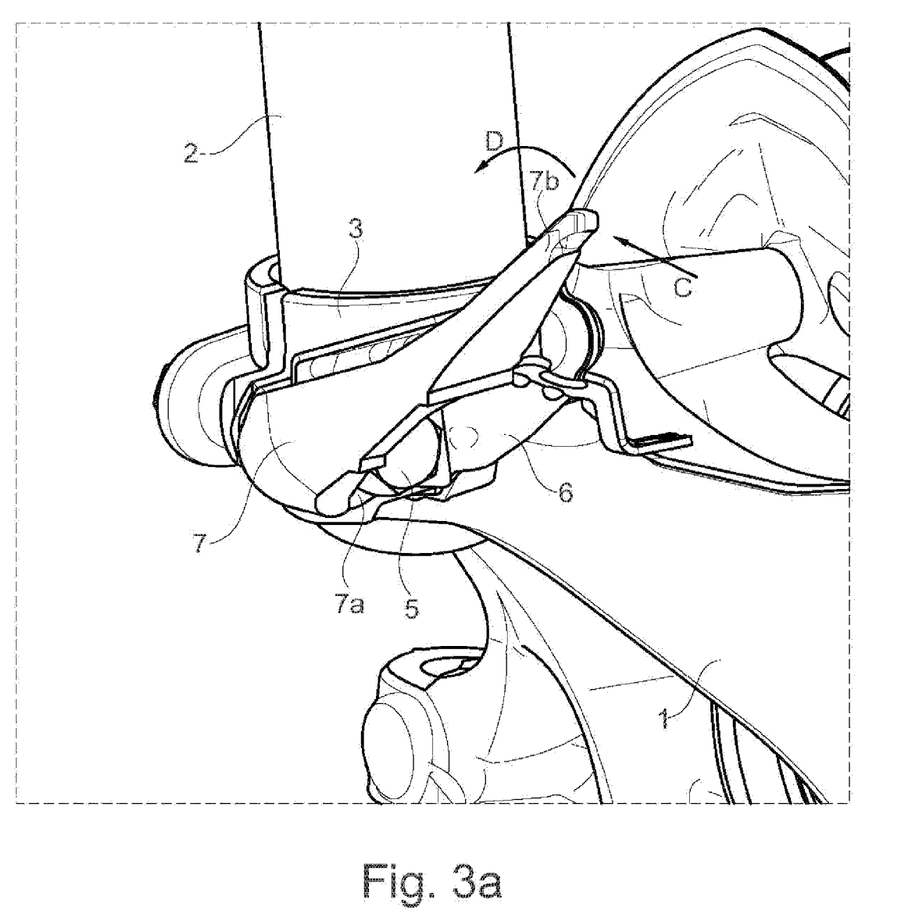
FIG. 3A depicts a second lever structure (acting preferentially in the x-z plane)
Figure 3B:
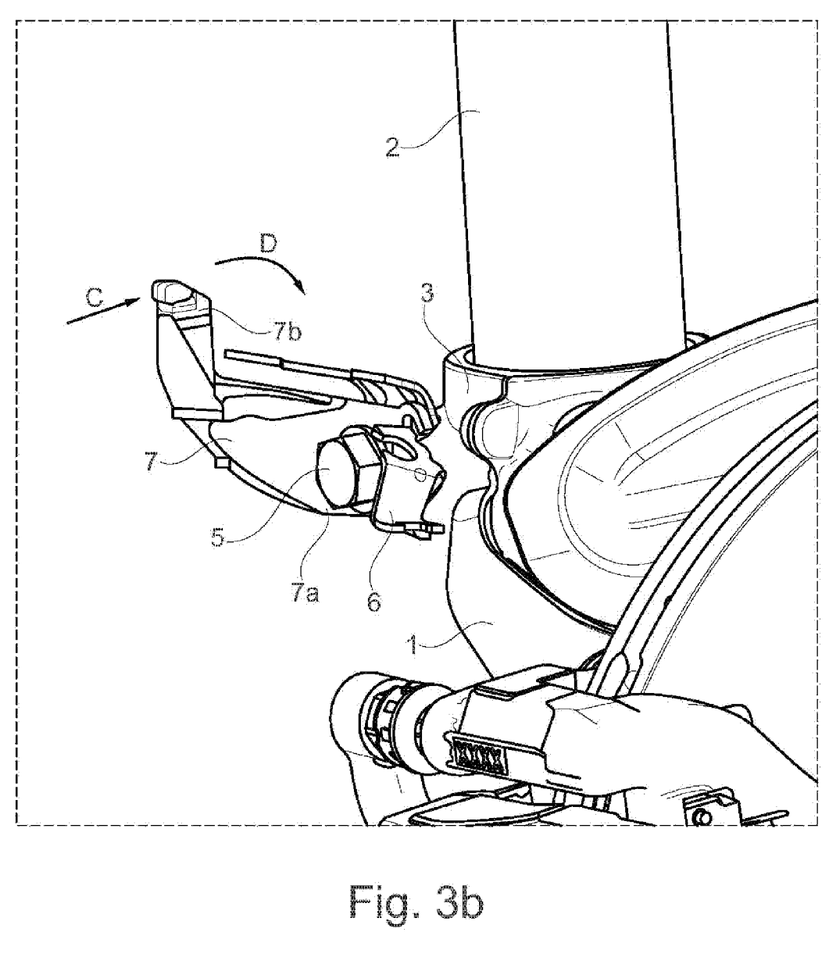
FIG. 3B is another view of the lever structure in FIG. 3A.

FIGS. 3A, 3B depict another embodiment of lever structure 7 according to the invention that functions preferentially in the x-z plane, in contrast to the above-described embodiments. The view or perspective here in FIG. 3A is similar to that of FIG. 1, whereas FIG. 3B provides a view obliquely from the front outside approximately at an angle of roughly 45°, partially toward the rear and toward the center longitudinal plane of the vehicle. Here, lever structure 7 extends starting from attachment section 7a located under bolt head 5 of bolt-type connection 5 first slightly in the vehicle transverse axis inward, then in each case partially approximately in the vehicle travel direction (x-axis) frontward and upward (in the z-axis). The free end of thus-designed lever structure 7 that is located slightly within suspension strut 2 as viewed here in the vehicle transverse axis forms impact section 7b of the structure. Now this lever structure 7 is of such solid design that lever structure 7 is pivoted away or folded away to the rear approximately in an x-z plane indicated by arrow D with impact section 7b thereof upon striking the above-mentioned obstacle or other object caused by this obstacle striking the impact section as indicated by arrow C, and at the same time (again as intended) releases or at least loosens bolt-type connection 5 through attachment section 7a of the structure.

Figure 4A:
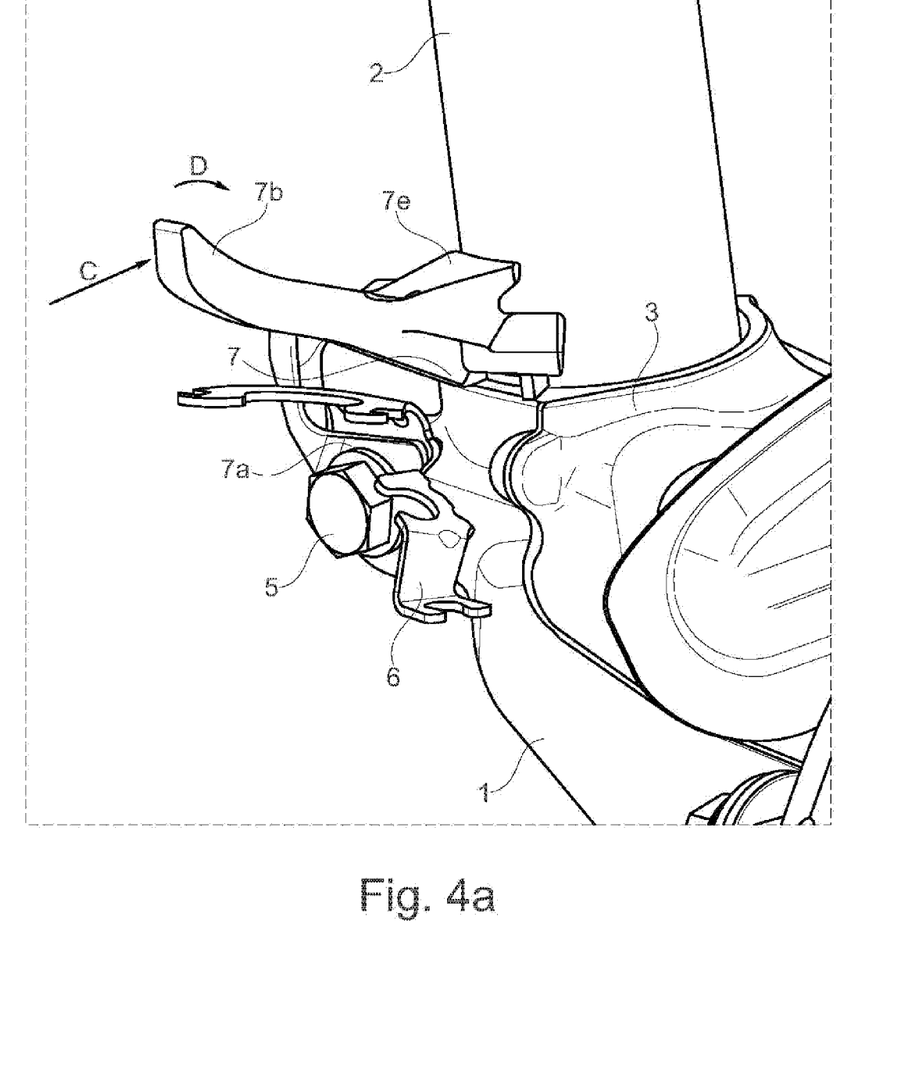
FIG. 4A depicts a third lever structure that acts preferentially in the x-z plane but differently from the second embodiment.
Figure 4B:
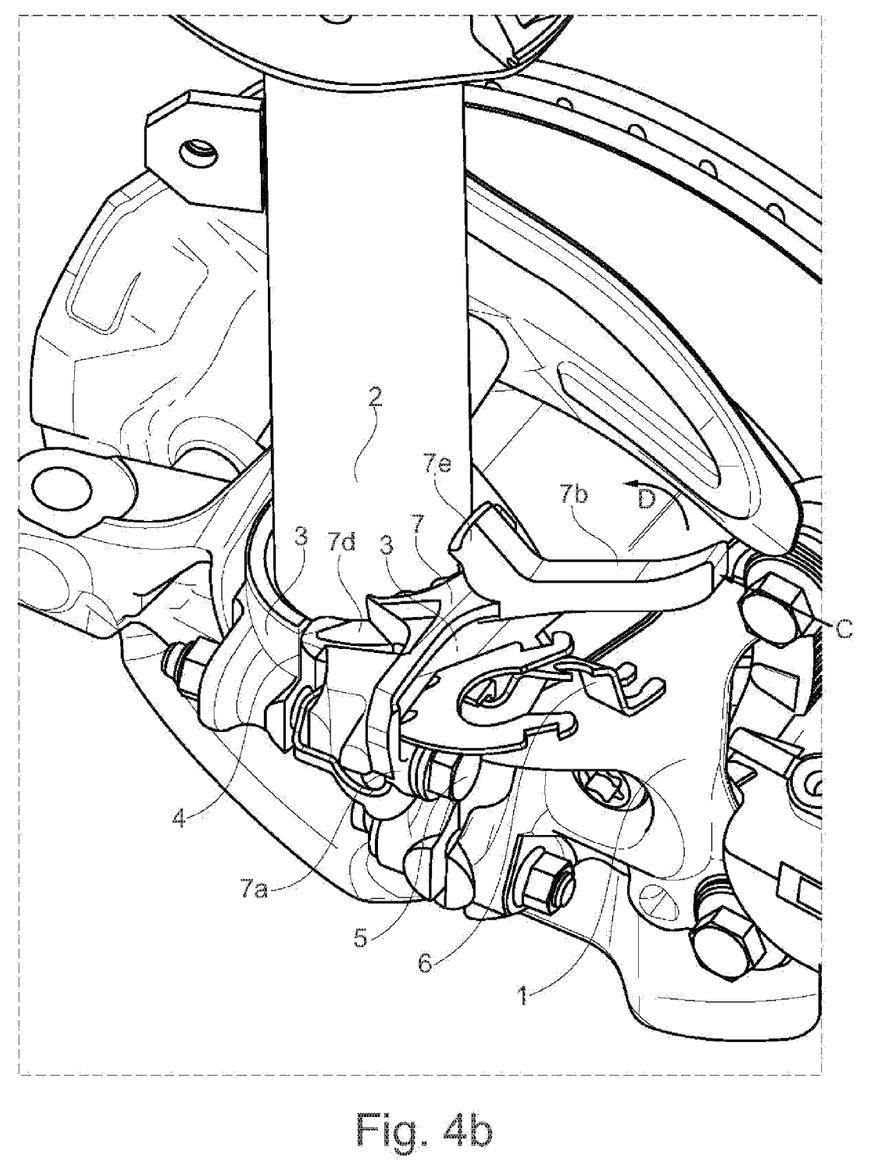
FIG. 4B is another view of the lever structure in FIG. 4A.

FIGS. 4A, 4B depict another embodiment of lever structure 7 according to the invention that again functions preferentially in the x-z plane. The view or perspective in FIG. 4A is similar to that of FIG. 3B, while FIG. 4B provides a view obliquely from above essentially in the vehicle transverse axis outward and downward, with a small proportion of the perspective being from the front to the rear. Lever structure 7 in this embodiment extends starting from attachment section 7a located under bolt head 5 of bolt-type connection 5 first upwards to the end face of suspension strut base 2, in order then to extend in each case partially at least approximately in the vehicle travel direction (x-axis) frontward and upward (in the z-axis). The free end of thus-designed lever structure 7 that is located as viewed in the vehicle transverse axis in the area of the center longitudinal axis of suspension strut 2 forms impact section 7b of the structure. At the same time lever structure 7 is supported on suspension strut base 2 or the housing thereof by an abutment section 7e linearly opposite impact section 7b, which abutment section also can be or is called cutting-edge section 7e. Now this lever structure 7 is of such solid design that lever structure 7 is pivoted away or folded away to the rear approximately in an x-z plane indicated by arrow D with impact section 7b thereof upon striking the above-mentioned obstacle or other object caused by this obstacle striking impact section 7b as indicated by arrow C, where abutment section 7e or cutting-edge section 7e digs into suspension strut 2 or the housing thereof. The damage caused to suspension strut 2 results, as intended, in at least a partial release of the strut in or from clamping seat connection 3.

Analogously to the embodiment of FIG. 1, a securing section 7d of lever structure 7 in the above-described embodiment also projects into slot 4 of the structure provided on wheel carrier 1 that forms clamping seat connection 3, as FIG. 4B illustrates. This ensures that lever structure 7 is not deformed in a way that negatively affects the intended function thereof in the event the referenced obstacle or other object strikes impact section 7b.

Figure 5:
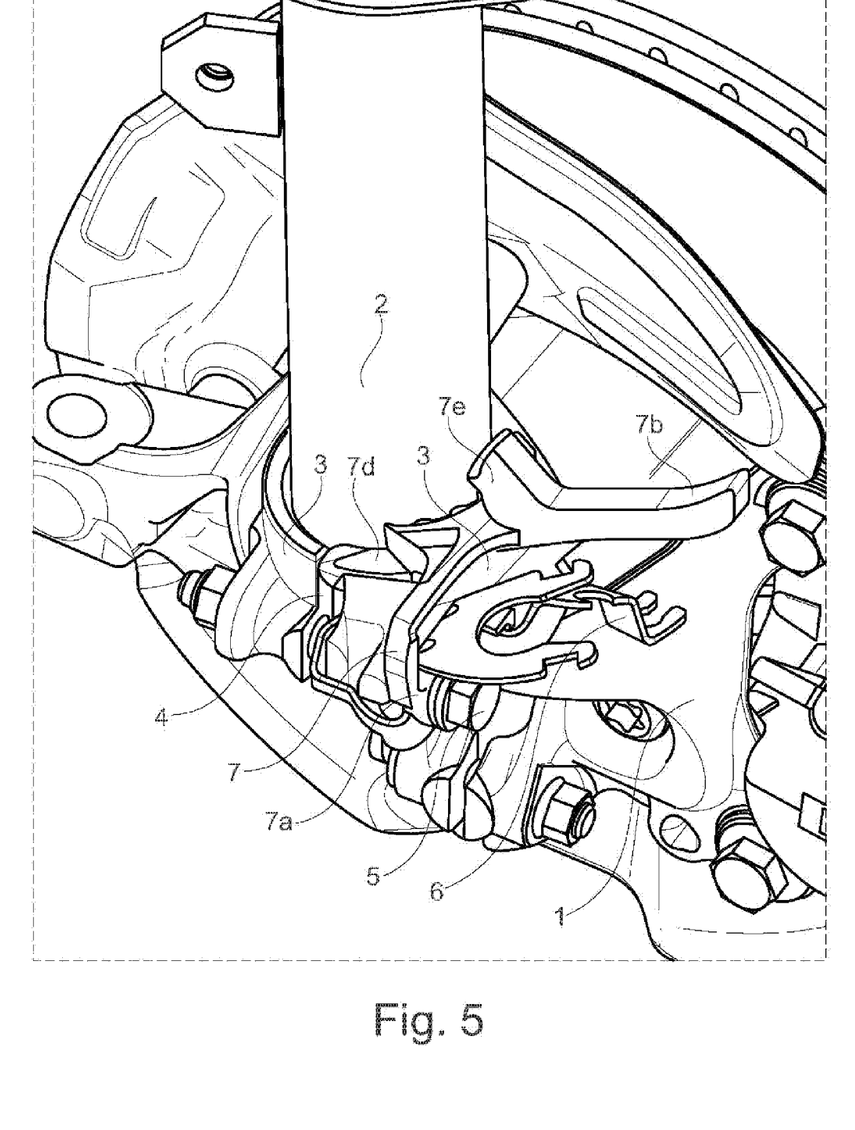
FIG. 5 depicts a modification of the embodiment in FIGS. 4A, 4B.

Whereas in the embodiment of FIGS. 4A, 4B, the abutment section or cutting-edge section 7e of lever structure 7, which section contacts suspension strut 2 or comes into contact with suspension strut (base) 2 in a vehicle crash when an obstacle or the like strikes impact section 7b of lever structure 7, has a concave shape conforming to the circular-cylindrical shape of suspension strut 2, in the embodiment of FIG. 5 this abutment section or cutting-edge section 7e has a convex shape, with the result that a force-intensive point contact, as necessary, is created first between this section 7e and base 2 of suspension strut 2. Analogously to FIG. 4B, FIG. 5 here also shows that securing section 7d of lever structure 7 projects for the reason already explained above into slot 4 of the structure that is provided on wheel carrier 1 and forms clamping seat connection 3.

Figure 6:
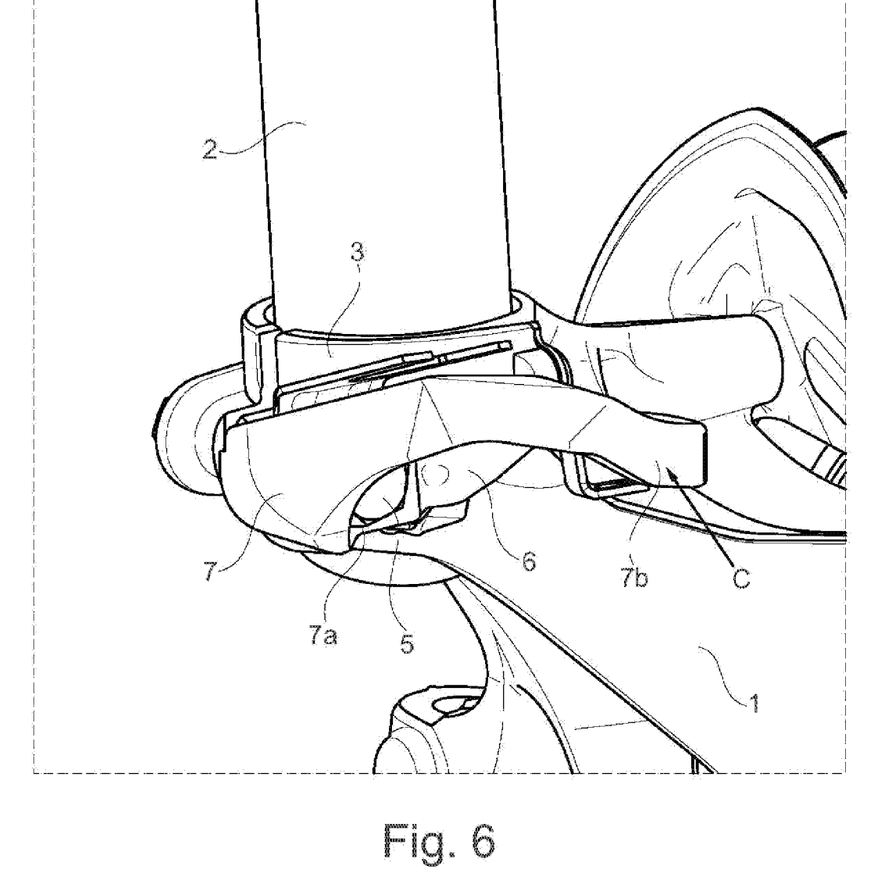
FIG. 6 depicts a first lever structure acting preferentially in the x-y plane

Finally, FIG. 6 (in a view analogous to FIG. 3) depicts another embodiment that functions in the x-y plane in a manner similar to that of FIG. 1. In contrast to the embodiment of FIG. 1, lever structure 7 of FIG. 6 extends starting from attachment section 7a, attached by bolt-type connection 5, to clamping seat connection 3 first slightly inward in the vehicle transverse axis and subsequently slightly frontward in the vehicle travel direction or vehicle longitudinal axis x, in order then to extend essentially in the vehicle transverse axis (y) outward, i.e., toward the wheel. The thus-created free end section of lever structure 7 again forms referenced impact section 7b thereof. Whenever an obstacle (or other object) strikes this impact section 7b as indicated by arrow C, this effects a displacement of this impact section 7b to the rear at least approximately opposite the travel direction, with the result that attachment section 7a of lever structure 7 again at least partially releases bolt-type connection 5. This results in the intended partial release of suspension strut 2 in or from clamping seat connection 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A wheel carrier of a vehicle, comprising:
a clamping seat connection configured to receive a suspension element, the clamping seat connection comprising a bolt connection to clamp the suspension element in the clamping seat connection;
a lever structure attached via the bolt connection to the clamping seat connection of the wheel carrier, wherein the lever structure comprises an impact section projecting from the bolt connection and configured so that an object striking the impact section in a vehicle crash causes an at least partial release of the suspension element in or from the clamping seat connection as a result of the impact.

2. The wheel carrier according to claim 1, wherein the impact section of the lever structure is configured to extend essentially in a vehicle transverse axis at least slightly into a free space between the wheel carrier and an axle beam or a body of the vehicle.

3. The wheel carrier according to claim 1, wherein
the impact section of the lever structure extends, starting from an attachment section by which the lever structure is attached to the wheel carrier via the bolt connection, partially in a travel direction of the vehicle and then at least partially in a vehicle transverse axis laterally outward.

4. The wheel carrier according to claim 1, wherein
the impact section of the lever structure extends, starting from an attachment section by which the lever structure is attached to the wheel carrier via the bolt connection, in both a vehicle travel direction as well as in a direction of a vertical axis of the vehicle.

5. A wheel carrier of a vehicle, comprising:
a clamping seat connection configured to secure a suspension element, the clamping seat connection comprising an annular slotted band and a bolt configured to tighten and loosen the annular band;
a lever structure comprising an attachment section and an impact section adjacent the attachment section, wherein
the attachment section of the lever structure is secured to the clamping seat connection via the bolt of the clamping seat connection, and
the impact section is configured to project from the attachment section secured via the bolt such that an object striking the impact section in an event of a vehicle crash causes the lever structure to at least partially release the suspension element in or from the clamping seat connection.

6. The wheel carrier according to claim 5, wherein the impact section of the lever structure extends essentially in a vehicle transverse axis into a free space between the wheel carrier and an axle beam or body of the vehicle.

7. The wheel carrier according to claim 5, wherein the impact section of the lever structure extends, beginning from the attachment section, in a travel direction of the vehicle and at least partially in a laterally outward direction of the vehicle transverse axis.

8. The wheel carrier according to claim 5, wherein the impact section of the lever structure extends, beginning from the attachment section, both in a vehicle travel direction and in an upward direction of a vertical axis of the vehicle.

* * * * *